(12) United States Patent
Takamatsu et al.

(10) Patent No.: US 8,470,931 B2
(45) Date of Patent: Jun. 25, 2013

(54) ADHESIVE FILM, PRODUCTION METHODS OF SHAPED BODY

(75) Inventors: Yorinobu Takamatsu, Sagamihara (JP); Hiroki Wakamatsu, Sagamihara (JP)

(73) Assignee: 3M Innovation Properties Company, St. Paul, MN (US)

( * ) Notice: Subject to any disclaimer, the term of this patent is extended or adjusted under 35 U.S.C. 154(b) by 304 days.

(21) Appl. No.: 12/669,935

(22) PCT Filed: Jul. 29, 2008

(86) PCT No.: PCT/US2008/071428
§ 371 (c)(1),
(2), (4) Date: Jun. 22, 2010

(87) PCT Pub. No.: WO2009/018253
PCT Pub. Date: Feb. 5, 2009

(65) Prior Publication Data
US 2010/0316872 A1 Dec. 16, 2010

(30) Foreign Application Priority Data
Jul. 31, 2007 (JP) .................. 2007-198964

(51) Int. Cl.
| | | |
|---|---|---|
| *C08L 33/00* | (2006.01) | |
| *C08L 33/02* | (2006.01) | |
| *C08L 33/04* | (2006.01) | |
| *C08L 33/24* | (2006.01) | |
| *C08L 35/00* | (2006.01) | |
| *C08L 35/02* | (2006.01) | |
| *C08L 39/00* | (2006.01) | |

(52) U.S. Cl.
USPC ............ 525/217; 525/218; 525/221; 525/222

(58) Field of Classification Search
USPC .................. 525/217, 218, 221, 222
See application file for complete search history.

(56) References Cited

U.S. PATENT DOCUMENTS

| | | |
|---|---|---|
| 4,045,517 A | 8/1977 | Guerin |
| 6,448,339 B1 | 9/2002 | Tomita |
| 6,939,911 B2 | 9/2005 | Tosaki |
| 2004/0202879 A1 | 10/2004 | Xia |
| 2007/0020474 A1 | 1/2007 | Tosaki |

FOREIGN PATENT DOCUMENTS

| | | |
|---|---|---|
| WO | WO 98/51754 | 11/1998 |
| WO | WO 2004/094549 | 11/2004 |
| WO | WO 2005/023913 | 3/2005 |

OTHER PUBLICATIONS

International Search Report for PCT/US2008/071428, 3 pgs.

*Primary Examiner* — Nathan M Nutter (57) ABSTRACT

An adhesive film comprising a substrate and an adhesive layer on said substrate, said adhesive layer comprising: (A) a carboxyl group-containing (meth)acrylate polymer having a glass transition temperature (Tg) of 25 C or lower, said carboxyl group-containing (meth)acrylate polymer having a percent number of repeating units of 4.0 to 25% based on the total number of repeating units of the (meth)acrylate polymer; and (B) an amino group-containing (meth)acrylate polymer having a glass transition temperature (Tg) of 75 C or higher, said amino group-containing (meth)acrylate polymer having a percent number of amino group-containing repeating units of 3.5 to 15% based on the total number of repeating units of the (meth)acrylate polymer, wherein the ratio by weight of said component (A) to said component (B) is from 62:38 to 75:25.

18 Claims, 2 Drawing Sheets

ADHESIVE FILM, PRODUCTION METHODS OF SHAPED BODY

CROSS REFERENCE TO RELATED APPLICATIONS

This application is a national stage filing under 35 U.S.C. §371 of PCT/US2008/071428 filed Jul. 29, 2008, which claims priority to Japanese Application No. 2007-198964, filed Jul. 31, 2007, the disclosure of which is incorporated by reference in its/their entirety herein.

TECHNICAL FIELD

The present invention relates to an adhesive film, a production method of a shaped body using the same, and a shaped body obtained. More specifically, the present invention provides an adhesive film excellent in the adhering property at high temperatures, a production method of a shaped body using the same, and a shaped body obtained thereby.

BACKGROUND ART

Insert molding is used as a method for decorating a surface of a cubic structure such as three-dimensionally shaped substrate, but a mold must be produced for each product and this method is unsuitable for dealing with various products.

A method of adhering a decoration film or a protective film to a cubic structure such as three-dimensionally shaped substrate can easily respond to various products and is advantageous. In order to successfully and neatly adhere a film to a cubic structure such as three-dimensionally shaped substrate, the film is adhered using a vacuum heat and pressure applicator or the like while heating and extending the film. Therefore, a heat-sensitive adhesive is generally used for the adhesion to an adherend. However, a sufficiently high adhering property cannot be exerted instantaneously after adhesion, and there is a problem in the hot adhering property/hot holding power.

Conventional compositions close to that of the adhesive layer of the present invention include the followings, though these are not technically related to the present invention.

Japanese Patent No. 3516035 (WO 1998/051754) discloses a pressure-sensitive adhesive composition obtained by adding (2) from 1 to 40 parts by weight of an amino group-containing adhesion-enhancing component having a Tg of 40° C. or more and a weight average molecular weight of 100,000 or less to (1) 100 parts by weight of a carboxyl group-containing adhesive component having a weight average molecular weight of 800,000, and this composition when adhered to a plastic exhibits foaming resistance at high temperatures.

Japanese Unexamined Patent Publication (Kohyo) No. 2006-522856 (WO 2004/094549) discloses an optically transparent pressure-sensitive adhesive composition comprising a blend which comprises from 70 to 90 wt % of a pressure-sensitive adhesive component containing at least one polymer having an acid functional group or a base functional group; from 10 to 30 wt % of a high-Tg (20° C. or more) polymer containing an acid functional group or a base functional group and having a weight average molecular weight of 100,000 or more; and a crosslinking agent.

U.S. Pat. No. 4,045,517 discloses a hot-melt adhesive composition comprising:

(A) from 5 to 95 parts by weight of a polymer comprising the following components (1) and (2) and having a glass transition temperature (Tg) of −85 to 0° C.:

(1) from 85 to 99.5 parts by weight of an alkyl acrylate or alkoxyalkyl acrylate having a carbon number of 2 to 18; and (2) from 0.5 to 15 parts by weight of an ethylenically unsaturated amine, carboxylic acid, sulfonic acid or mixture thereof and (B) from 5 to 95 parts by weight of a polymer comprising the following components (3) and (4) and having a Tg of 20 to 150° C.:

(3) from 85 to 99.5 parts by weight of an alkyl, cycloalkyl or isobornyl (meth)acrylate; and (4) from 0.5 to 15 parts by weight of an ethylenically unsaturated amine, carboxylic acid, sulfonic acid or mixture thereof, wherein either one of (A) and (B) contains an acid group and another one contains an amino group.

Japanese Unexamined Patent Publication (Kohyo) No. 2005-105256 (WO 2005/023913) proposes a poly(meth)acrylate film composition obtained by blending (A) a carboxyl group-containing poly(meth)acrylate having a Tg of 0° C. or more, and (B) a tertiary amino group-containing poly(meth)acrylate having a Tg of 0° C. or less, or blending (C) a tertiary amino group-containing poly(meth)acrylate having a Tg of 0° C. or more, and (D) a carboxyl group-containing poly(meth)acrylate having a Tg of 0° C. or less, wherein (A):(B)=from 10:90 to 90:10 wt % and (C):(D)=from 10:90 to 90:10 wt %.

DISCLOSURE OF THE INVENTION

As described above, when an adhesive film is adhered to a cubic structure such as three-dimensionally shaped substrate while heating and extending the film, conventional heat-sensitive adhesives cannot instantaneously exert a sufficiently high adhering property, and therefore allow for occurrence of sliding or separation at edges. Also, in the case of using a conventional pressure-sensitive adhesive, the formed film when subjected to a high-temperature condition cannot endure the shrinking force due to the residual stress at the extending, and causes sliding or separation at edges. Particularly, in a portion having a large film elongation and further in the case of adhesion to a recessed surface, it is difficult for conventional heat-sensitive adhesives or pressure-sensitive adhesives to completely prevent sliding or separation at edges.

In Japanese Patent No. 3516035 which is a pressure-sensitive adhesive (at ordinary temperature), the blending amount of the amino group-containing polymer is 20 wt % or less and therefore, the hot adhering property/hot holding power is insufficient. In an Example, a composition comprising a 71.5:28.5 wt % blend of n-butyl acrylate (BA)/acrylic acid (AA)=95 wt %:5 wt % (carboxyl group-containing monomer amount: 8.6 mol %) and methyl methacrylate (MMA)/dimethyl aminoethyl methacrylate (DM)=95 wt %:5 wt % (amino group-containing monomer amount: 3.2 mol % is disclosed, but miscibility with the carboxyl group-containing polymer is poor because the amino group amount is less than 3.5 mol %, and this gives rise to failure in exerting a sufficiently high adhesive force at a high temperature of 100° C. and inferiority in hot adhering property/hot holding power.

In Japanese Unexamined Patent Publication (Kohyo) No. 2006-522856 which relates to a pressure-sensitive adhesive (at ordinary temperature), the blending amount of the amino group-containing polymer is 15 wt % or less in the Examples and the hot adhering property/hot holding power is insufficient.

In U.S. Pat. No. 4,045,517 which relates to a hot-melt adhesive, the adhesive becomes liquid at a high temperature and lacks the hot adhering property/hot holding power.

In Japanese Unexamined Patent Publication (Kohyo) No. 2005-105256 which relates to a film, use as an adhesive is not envisaged and also, due to high blending amount of 40 wt % or more of the amino group-containing polymer, wettability of the adhesive to an adherend is low and the adhering property at an ordinary temperature is poor.

Therefore, an object of the present invention can be to provide an adhesive film using an adhesive composition ensuring that a sufficiently high adhering property is instantaneously exerted upon adhering under heat and pressure, the adhering property and holding property at high temperatures are excellent and even when the film is subjected to a high-temperature condition after adhesion, separation is not caused at all; a production method of a shaped body using the adhesive film; and a shaped body obtained thereby.

According to the present invention, an adhesive film comprising a substrate and an adhesive layer on the substrate, is provided, the adhesive layer comprising:

(A) a carboxyl group-containing (meth)acrylic polymer having a percent number of carboxyl group-containing repeating units of 4.0 to 25% based on the total number of repeating units of the polymer and having a glass transition temperature (Tg) of 25° C. or lower, and (B) an amino group-containing (meth)acrylic polymer having a percent number of amino group-containing repeating units of 3.5 to 15% based on the total number of repeating units of the polymer and having a glass transition temperature (Tg) of 75° C. or higher, wherein the ratio by weight of the component (A) to the component (B) is from 62:38 to 75:25.

The present invention also provides a method for forming a shaped body, comprising a step of adhering the adhesive film as described above to a surface of a shaped body under heat and pressure. In a preferred embodiment, the shaped body has a three-dimensional surface and the adhering of the adhesive film is performed by means of a vacuum heat and pressure applicator.

According to the present invention, a shaped body having adhered onto a surface thereof the adhesive as described above is further provided. This shaped body is useful for a three-dimensionally shaped automobile interior which is subjected to a high temperature.

In the case where the adhesive film of the present invention is used as an adhesive film which is adhered to a shaped body by a hot forming method, the adhesive film can be prevented from occurrence of sliding or separation from the adherend even when it is subjected to a high temperature of, e.g., 100° C. for a long time after the adhesion.

The adhesive film of the present invention can satisfy the heat resistance required of automobile interior products.

MODES FOR CARRYING OUT THE INVENTION

The present invention provides an adhesive film comprising a substrate and an adhesive layer on the substrate, the adhesive layer comprising:

(A) a carboxyl group-containing (meth)acrylic polymer having a percent number of carboxyl group-containing repeating units of 4.0 to 25% based on the total number of repeating units of the polymer and having a glass transition temperature (Tg) of 25° C. or lower, and (B) an amino group-containing (meth)acrylic polymer having a percent number of amino group-containing repeating units of 3.5 to 15% based on the total number of repeating units of the polymer and having a glass transition temperature (Tg) of 75° C. or higher, wherein the ratio by weight of the component (A) to the component (B) is from 62:38 to 75:25.

This adhesive film is adhered to an adherend (shaped body) by adhesion under heat and pressure.

The adhesive film which adheres under heat and pressure is mainly used for the adhesion of a film for decorating or protecting an adherend having a three-dimensional shape. In order to firmly contact the film with a surface having a three-dimensional shape, the film is preferably adhered by softening and extending it under heating. Representatively, the adhesion may be performed using a vacuum heat and pressure applicator.

The substrate of the adhesive film may be sufficient if it has heat resistance to the heating temperature at the step of adhering under heat and pressure, and is not particularly limited, but preferred examples thereof include a thermoplastic resin such as polyester resin (e.g., polyethylene terephthalate (PET), polybutylene terephthalate (PBT) and polyethylene naphthalate (PEN)), vinyl chloride resin, polycarbonate resin, ABS resin, polyurethane resin, poly(meth)acrylate resin (e.g., polymethyl methacrylate), and polyolefin resin (e.g., polyethylene, polypropylene).

The degree of heat resistance depends on the usage but is generally 60° C. or more, preferably 80° C. or more. For example, in automobile interior use, when the maximum temperature in the cabin is set to 80° C., further to 100° C., the heat resistance is preferably from 100 to 110° C. or more, more preferably from 150 to 160° C. or more, still more preferably from 150 to 160° C. However, an excessively high heat resistance temperature is not necessary and may be sometimes rather disadvantageous because the film less extends at the adhesion under heat and pressure.

The extending property of the substrate may be adjusted by adding a plasticizer thereto.

In addition, according to the applications, the substrate may contain an inorganic particle such as silica, may contain an ultraviolet absorbent and other functionality-imparting substances, may be colored by a colorant, or may contain a white pigment for imparting printability to the surface, and various sheets can be used. Also, printing may be applied to the surface.

As for the substrate, those known as decoration films, protective films and the like all may be used and, for example, a decoration film or sheet on which surface a metal is vapor-deposited may also be used.

The thickness of the substrate is not limited, but particularly in the case of a decoration film (decoration sheet), the thickness is typically from 10 to 1,200 μm (1.2 mm), preferably from 25 to 300 μm.

The adhesive layer of the adhesive film of the present invention comprises the following components: (A) a carboxyl group-containing (meth)acrylic polymer having a percent number of carboxyl group-containing repeating units of 4.0 to 25% based on the total number of repeating units of the polymer and having a glass transition temperature (Tg) of 25° C. or lower, and (B) an amino group-containing (meth)acrylic polymer having a percent number of amino group-containing repeating units of 3.5 to 15% based on the total number of repeating units of the polymer and having a glass transition temperature (Tg) of 75° C. or higher, and the ratio by weight of the component (A) to the component (B) is from 62:38 to 75:25.

In the present invention, the acrylic polymer and methacrylic polymer are collectively referred to as a "(meth)acrylic" polymer. The (meth)acrylic polymer may also be a copolymer arbitrarily combined with a non-(meth)acrylate monomer other than the (meth)acryl-based monomer, for example, with a vinyl unsaturated monomer.

As for the monoethylenically unsaturated monomer constituting the (meth)acrylic polymer, a compound represented by the formula: $CH_2=CR_1COOR_2$ (wherein $R_1$ is hydrogen or a methyl group, and $R_2$ is a linear, branched or cyclic alkyl group, a phenyl group, an alkoxyalkyl group or a phenoxyalkyl group) is generally used as a main component, but in addition, an aromatic vinyl monomer such as styrene, σ-methylstyrene and vinyltoluene, and vinyl esters such as vinyl acetate are contained. Examples of such a monomer include an alkyl (meth)acrylate such as methyl (meth)acrylate, ethyl (meth)acrylate, n-butyl (meth)acrylate, isobutyl (meth)acrylate, tertiary-butyl (meth)acrylate, isoamyl (meth)acrylate, n-hexyl (meth)acrylate, cyclohexyl (meth)acrylate, 2-ethylhexyl (meth)acrylate, isooctyl (meth)acrylate, isononyl (meth)acrylate, isobornyl (meth)acrylate, dicyclopentanyl (meth)acrylate, decyl (meth)acrylate and dodecyl (meth)acrylate, a phenoxyalkyl (meth)acrylate such as phenoxyethyl (meth)acrylate, and an alkoxyalkyl (meth)acrylate such as methoxypropyl (meth)acrylate and 2-methoxybutyl (meth)acrylate, and one species or two or more species may be used according to the purpose for obtaining the desired glass transition temperature, adhering property and hot adhering property/hot holding power. The monoethylenically unsaturated monomer is preferably an alkyl (meth)acrylate ester (the carbon number of the alkyl group is preferably from 1 to 12).

The component (A) is a (meth)acrylic polymer having a glass transition temperature (Tg) of 25° C. or less and is a soft component. This soft component (A) itself has a self-adhering property at a room temperature, but the composition after mixing in the amount above with the component (B) exhibits almost no self-adhering property at a room temperature. However, if the soft component (A) is not contained or contained in a small amount, the adhesive less spreads on the adherend surface and is less wetted, and when the adhesive film is adhered under heat and pressure and then cooled to ordinary temperature, the adhesive layer is readily separated from the adherend, failing in exerting the satisfactory performance as an adhesive film, which is intended in the present invention. If the glass transition temperature (Tg) of the component (A) is not in the range of 25° C. or less, the desired effects described above cannot be obtained.

The (meth)acrylic polymer having a glass transition temperature (Tg) of 25° C. or less may be easily prepared by using, as the main component, a monomer of which homopolymer comes to have a glass transition temperature (Tg) of 25° C. or less. Examples of such a monomer include methyl acrylate, ethyl acrylate, n-butyl acrylate, isobutyl acrylate, isoamyl acrylate, 2-ethylhexyl (meth)acrylate, isooctyl (meth)acrylate and dodecyl (meth)acrylate. Considering the adhering property at room temperature and the cohesive force at high temperatures, the Tg of the (meth)acrylic polymer is from 0° C. to −50° C.

Furthermore, the component (A) is a (meth)acrylic polymer containing a carboxyl group. By virtue of the component (A) containing a carboxyl group and the component (B) containing an amino group, compatibility of the component (A) with the component (B) is enhanced, and phase separation between the component (A) and the component (B) in the adhesive composition can be avoided. If the component (A) and the component (B) are phase-separated, even when the component (A) and the component (B) are mixed, the above-described effects as an adhesive film cannot be obtained, that is, neither the desired adhering property under heating nor the desired hot adhering property/hot holding power can be obtained. In order to obtain this desired compatibility, the amount of the carboxyl group contained in the (meth)acrylic polymer as the component (A) is preferably from 4.0 to 25% in terms of the percent number of carboxyl group-containing repeating units based on the total number of repeating units of the polymer (sometimes expressed as the carboxyl group amount in mol %).

An unsaturated monomer containing a carboxyl group is copolymerized with the above-described monoethylenically unsaturated monomer, whereby a carboxyl group can be incorporated into the (meth)acrylic polymer. Examples of such a monomer include acrylic acid, methacrylic acid, malic acid, itaconic acid, ω-carboxypolycaprolactone mono(meth)acrylate, monohydroxyethyl phthalate (meth)acrylate, β-carboxyethyl (meth)acrylate, 2-(meth)acryloyloxyethylsuccinic acid and 2-(meth)acryloyloxyethylhexahydrophthalic acid. In view of yellowing resistance, (meth)acrylic acid, ω-carboxypolycaprolactone mono(meth)acrylate and β-carboxyethyl (meth)acrylate are preferred.

The molecular weight of the carboxyl group-containing (meth)acrylic polymer as the component (A) is not particularly limited but in general, the molecular weight is preferably, in terms of the weight average molecular weight, from about 100,000 to about 1,000,000, more preferably from about 200,000 to about 800,000. If the weight average molecular weight is small, the cohesive property tends to decrease, whereas if it is large, compatibility tends to decrease. However, as long as the polymer satisfies the conditions of the polymer (A), this is not particularly limited.

The component (B) is a (meth)acrylic polymer having a glass transition temperature (Tg) of 75° C. or more and is a hard component. If this hard component (B) is not contained or contained in a small amount, the adhesive only with the component (A) is a pressure-sensitive adhesive (at a room temperature), the heat resistance is low, and the hot adhering property/hot holding power is insufficient. By virtue of containing the component (B) having a glass transition temperature (Tg) of 75° C. or more, the adhesive expresses the self-adhering property at the adhesion under heating. Even when the adhesive film extended on and adhered to a three-dimensionally shaped adherend is subjected to a high temperature and shrunk due to residual stress, the self-adhesive film can withstand the shrinking force and can prevent the adhesive film from sliding or separation at edges. The glass transition temperature (Tg) of the component (B) must be 75° C. or more. As the Tg is higher, the high-temperature adhesive force near Tg can be increased, but if the Tg is excessively high, the adhering property at a room temperature may deteriorate to readily cause separation and the temperature at the adhesion under heat and pressure becomes higher than necessary. Therefore, Tg is preferably 250° C. or less, more preferably from 80 to 120° C.

The (meth)acrylic polymer having a glass transition temperature (Tg) of 75° C. or more can be easily provided by using, as the main component, a monomer of which homopolymer comes to have a Tg of 75° C. or more. Examples of such a monomer include methyl methacrylate, ethyl methacrylate, tertiary-butyl methacrylate, cyclohexyl methacrylate, isobornyl (meth)acrylate and dicyclopentanyl (meth)acrylate.

The component (B) is a (meth)acrylic polymer containing an amino group so that the compatibility of the component (A) with the component (B) can be enhanced and occurrence of phase separation between the component (A) and the component (B) can be prevented. If the component (A) and the component (B) are phase-separated, even when the component (A) and the component (B) are mixed, the above-described effects as an adhesive film cannot be obtained, that is, neither the desired adhering property under heating nor the desired hot adhering property/hot holding power can be obtained. In order to obtain this desired compatibility effect, the amount of the amino group contained in the (meth)acrylic polymer as the component (B) is preferably from 3.5 to 15% in terms of the percent number of amino group-containing repeating units based on the total number of repeating units of the polymer (sometimes expressed as the amino group amount in mol %).

Specific examples of the amino group-containing unsaturated monomer which is copolymerized with the above-described monoethylenically unsaturated monomer to constitute the amino group-containing (meth)acrylic polymer include a dialkylaminoalkyl (meth)acrylate such as N,N-dimethylaminoethyl acrylate (DMAEA) and N,N-dimethylaminoethyl methacrylate (DM), a dialkylaminoalkyl (meth)acrylamide such as N,N-dimethylaminopropylacrylamide (DMAPAA) and N,N-dimethylaminopropylmethacrylamide, and a monomer having a tertiary amino group, as represented by a vinyl monomer having a nitrogen-containing heterocycle, such as vinylimidazole.

The molecular weight of the amino group-containing (meth)acrylic polymer as the component (B) is not particularly limited but in general, the molecular weight is, in terms of the weight average molecular weight, preferably from about 10,000 to about 200,000, more preferably from about 40,000 to about 150,000. When the weight average molecular weight is small, the polymer tends to be poor in the hot adhering property/hot holding power, whereas when it is large, the compatibility tends to decrease. However, as long as a polymer satisfying the conditions of the component (B) can be produced, the average molecular weight is not particularly limited.

In order to obtain the above-described effects, the amounts of the component (A) and the component (B) are amounts such that the blending ratio of the component (A) to the component (B) becomes from 62:38 to 75:25 in terms of the weight ratio. If the amount of the component (A) is less than this range, the adhering property at room temperature and the adhering property under heating become insufficient, whereas if it exceeds the range above, the component (B) runs short and the hot adhering property/hot holding power becomes insufficient. If the amount of the component (B) is less than the range above, the hot adhering property/hot holding power becomes insufficient, whereas if it exceeds the range, wettability of the adhesive to the adherend surface decreases and the adhering property at room temperature and the adhering property under heating become insufficient. The blending ratio of the component (A) and the component (B) is preferably from 65:35 to 70:30 in terms of the weight ratio.

The (meth)acrylic polymer can be produced by a radical polymerization method, and examples of the production method thereof include a solution polymerization method, a suspension polymerization method, an emulsion polymerization method and a bulk polymerization method. These methods are known and can be used also in the present invention, and description of such a known method is not necessary in particular. As for the initiator, an organic peroxide such as benzoyl peroxide, lauroyl peroxide and bis(4-tertiary-butyl cyclohexyl) peroxidicarbonate, or an azo-based polymerization initiator such as 2,2'-azobisisobutyronitrile, 2,2'-azobis-2-methylbutyronitrile, 4,4'-azobis-4-cyanovaleric acid, dimethyl 2,2'-azobis(2-methylpropionate) and azobis 2,4-dimethylvaleronitrile (AVN), is used. The amount of the initiator used is preferably from 0.05 to 5 parts by weight per 100 parts by weight of the monomer mixture.

Other than these, the adhesive of the adhesive film of the present invention may contain, if desired, additives such as plasticizer, crosslinking agent (for example, a functional group-containing crosslinking agent of epoxy type, aziridine type, isocyanate type or bisamide type, and a metal chelate-based crosslinking agent), antioxidant, ultraviolet absorbent, pigment and filler.

The thickness of the adhesive layer of the adhesive film is not limited but is preferably from 5 to 100 μm, more preferably from 10 to 80 μm.

The formation of the adhesive layer on a substrate may be performed by a known method of coating an adhesive coating solution (for example, a blend of component A and component B) on an appropriate release film, drying the coating solution, stacking a substrate thereon, and, if desired, peeling off the release film. The adhesive coating solution may arbitrarily contain a third component or a solvent, in addition to the components A and B.

Figure 1:
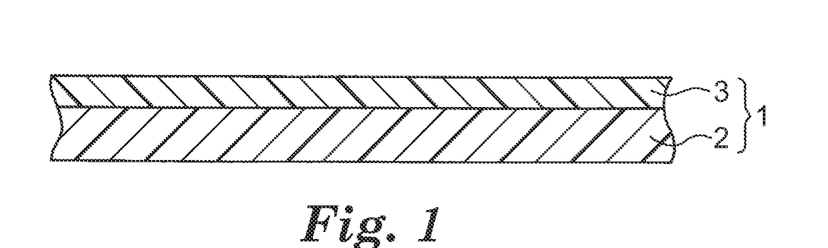
FIG. 1 is a schematic cross-sectional view of the adhesive film of the present invention.

FIG. 1 shows a cross-sectional view of the adhesive film. The adhesive film 1 has a substrate 2 and an adhesive layer 3.

The material for the adherend (shaped body) is not limited and may be a plastic, a metal, a wood material or the like as long as it has durability to the temperature at the adhesion under heat and pressure.

As for the adhesion of the adhesive film to an adherend (shaped body) under heat and pressure, the adhesive film may be adhered to an adherend by heating it to a temperature at which the adhesive expresses the self-adhering property. The heating temperature is not limited but is preferably 60° C. or more, more preferably from 80 to 140° C., still more preferably from 100 to 130° C. For example, an automobile interior part is required to have heat resistance of 80° C. in a severe condition, and a heat resistance of 100 to 110° C. in a more severe condition. Accordingly, an adhesive film capable of expressing heat resistance at such a temperature is used, and the heating and pressure-adhering conditions are appropriately selected.

The adhesive film of the present invention is adhered to an adherend under heat and pressure and is suitably used particularly when the adherend has a three-dimensional shape. In the case where the adherend has a three-dimensional shape, the adhesive film needs to be adhered to the adherend surface while extending at the adhesion under heat and pressure and allows the presence of residual stress in the extended portion, but even when residual stress exists, the adhesive film of the present invention can maintain the adhesive force both at the heating to a high temperature and at the cooling to a room temperature. Assuming that the area of the film before extension is 100 area %, the extension at the adhesion is usually within 300 area % (extension to about 1.73 times in both longitudinal and transverse directions), though this may vary depending on the adherend shape.

The hot adhering property/hot holding power can be evaluated by whether the adhesive film can hold for 24 hours or more in a "constant-load peeling test" of cutting the adhesive film adhered to an adherend into a width of 25 mm and a length of 50 mm, hanging a weight of 100 g from an edge part of the adhesive film to apply the load in the 90° direction in an atmosphere of 100° C., and measuring the time until a film length of 50 mm is separated.

In order to obtain the adhesion reliability as a film used for the automobile interior, it is demanded to exert the adhesive force of 10 N/25 mm or more not only at 25° C. but also at 100° C., and the adhesive film of the present invention can satisfy this requirement.

Adhesion under heat and pressure by means of a vacuum heat and pressure applicator is most preferred. The vacuum heat and pressure applicator is known, but the process of vacuum adhesion under heat and pressure is schematically described by referring to FIG. 2.

Figure 2A:
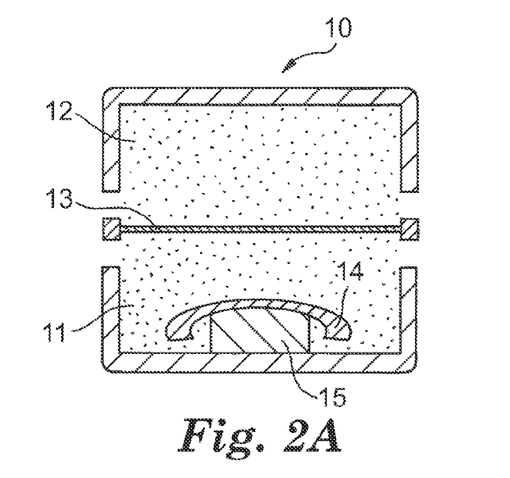
FIGS. 2A-2E are schematic views explaining the process of adhering an adhesive film onto an adherend by using a vacuum heat and pressure applicator.
Figure 2B:
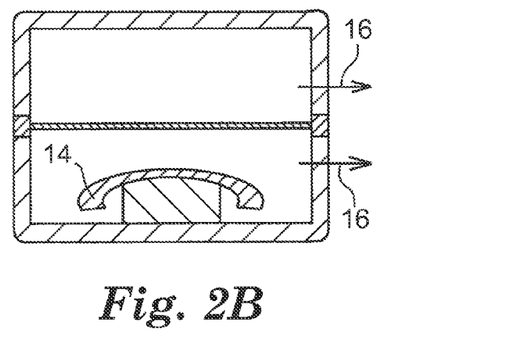
Figure 2C:
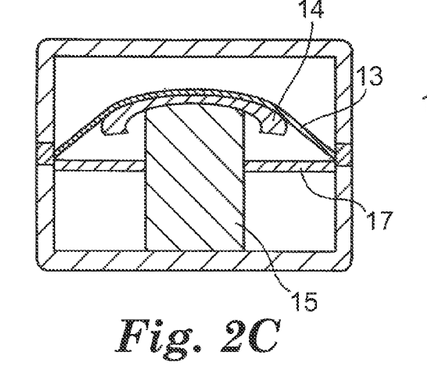
Figure 2D:
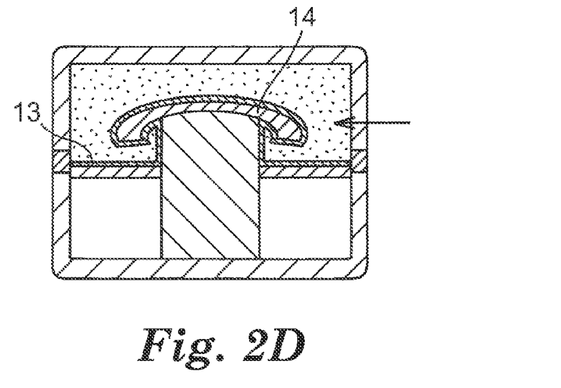

In FIG. 2(A), a (lower) vacuum chamber 11 and a (upper) vacuum chamber 12 of a vacuum heat and pressure applicator 10 are opened to an atmospheric pressure, and an adhesive film 13 is set therebetween. In the (lower) vacuum chamber 11, an adherend 14 is set on a lifting Table 15. In FIG. 2(B), the (lower) vacuum chamber 11 and (upper) vacuum chamber 12 are closed, and both chambers are made to form a vacuum (for example –1 MPa) in the inside by vacuum evacuation 16. As shown in FIG. 2(C), when the adherend 14 is pushed up to the (upper) vacuum chamber 12 by the lifting table 15 while heating the adhesive film 13, the adhesive film 13 extends, and the (lower) vacuum chamber 11 and the (upper) vacuum chamber 12 are divided by appropriate means 17. Referring to FIG. 2(D), an appropriate pressure (for example, 2 MPa) is applied to the inside of the (upper) vacuum chamber 12 in the state of the adhesive film 13 being heated, as a result, the adhesive film 13 is pressed to the surface of the adherend 14, extends along the surface, and forms a coating in tight contact with the surface. At this time, the adhesive film 13 extends not only around the side surface of the adherend 14 but also over the back side 19 to neatly cover the surface without wrinkling Referring to FIG. 2(E), the edge of the adherend film 13 tightly contacted to the surface of the adherend 14 is subjected to trimming 18, whereby the vacuum adhesion under heat and pressure is completed. The vacuum adhesion under heat and pressure by a vacuum heat and pressure applicator is not limited thereto, and modification can be made. Of course, the heating or pressurizing conditions can be varied.

The usage of the adhesive film of the present invention is not limited, but examples thereof include an automobile interior material, a building material, a decorative laminate and a washstand.

Figure 2E:
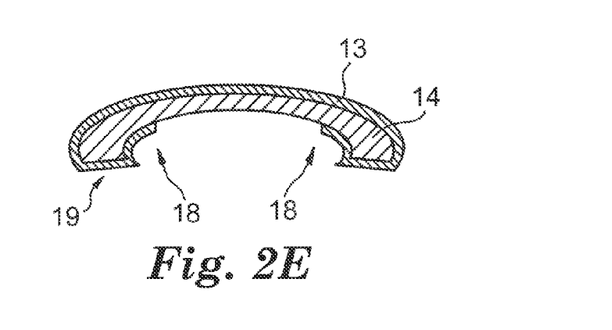

FIG. 2(E) shows one example of the shaped body obtained by the vacuum adhesion process under heat and pressure using a vacuum heat and pressure applicator shown in FIGS. 2(A) to 2(D). By the use of a vacuum heat and pressure applicator, the adhesive film 13 is adhered to the surface of the adherend 14, and this is characterized in that the adhesive film 13 is adhered by uniformly extending even to the portion on the back side 19 of the adherend 14, entering of a bubble between the adhesive film 13 and the adherend 14 is not allowed at all, and despite extending over the three-dimensional back side, the adhesive film 13 does not have wrinkles in any portion including the corner part.

Figure 3:
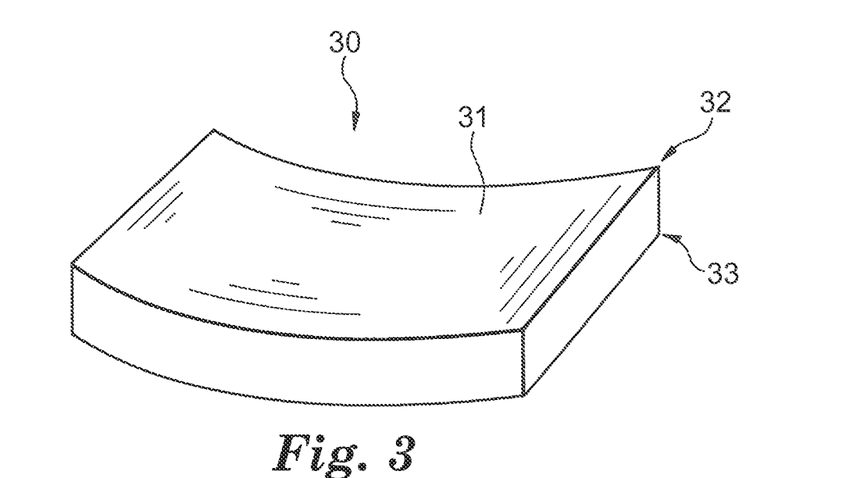
FIG. 3 is a view showing an example of the shaped body obtained by adhering the adhesive film of the present invention.

In the case of vacuum adhering a conventional adhesive film under heat and pressure to such a shaped body having a three-dimensional shape, when the shaped body is subjected to a high temperature at the pressure adhesion or in use, sliding or separation of the adhesive film at edges occurs. However, in the case of vacuum adhering the adhesive film of the present invention under heat and pressure, even when the shaped body is subjected to a high temperature at the pressure adhesion or in use, sliding or separation of the adhesive film at edges does not occur. Furthermore, as shown in FIG. 3, in the case where, for example, the main surface of the shaped body 30 having a three-dimensional shape is a recessed surface 31, when the conventional adhesive film is used, the adhesive film cannot be adhered to the recessed main surface with sufficiently high strength and causes separation from the recessed main surface, but the adhesive film of the present invention can exhibit self-adhering property at high temperatures and can maintain the adhesive force after cooling, so that the adhesive film can be tightly contacted even with the recessed main surface without causing separation at all. Also, the adhesive film which is vacuum adhered under heat and pressure is tightly contacted by extending around the side surface and even over the back side and is completely free of wrinkles, for example, even in the periphery of the corner parts 32 and 33 of the shaped body shown in FIG. 3.

EXAMPLES

| | Raw Materials |
|---|---|
| BA: | n-butyl acrylate (produced by Mitsubishi Chemical Corporation) |
| 2EHA: | 2-ethylhexyl acrylate (AEH, produced by Nippon Shokubai Co., Ltd.) |
| IOA: | isooctyl acrylate (produced by 3M) |
| iso-BA: | isobutyl acrylate (produced by Mitsubishi Chemical Corporation) |
| AA: | acrylic acid (produced by Toagosei Co., Ltd.) |
| V-65: | azobis(2,4-dimethylvaleronitrile) (produced by Wako Pure Chemical Industries, Ltd.) |
| MMA: | methyl methacrylate (Acryester M, produced by Mitsubishi Rayon Co., Ltd.) |
| BMA: | n-butyl methacrylate (Acryester B, produced by Mitsubishi Rayon Co., Ltd.) |
| CHMA: | cyclohexyl methacrylate (Acryester CH, produced by Mitsubishi Rayon Co., Ltd.) |
| DM: | dimethylaminoethyl methacrylate (Acryester DM, produced by Mitsubishi Rayon Co., Ltd.) |
| DMAPAA: | N,N-dimethylaminopropylacrylamide (DMAPAA, produced by Kohjin Co., Ltd.) |
| Vim: | 1-vinylimidazole (produced by Tokyo Kasei Kogyo Co., Ltd.) |
| V-601: | dimethyl-2,2'-azobis(2-methylpropionate) (produced by Wako Pure Chemical Industries, Ltd.) |
| E-5XM: | epoxy resin-based crosslinking agent solution (5 wt % 2-butanone solution) (produced by The Soken Chemical & Engineering Co., Ltd.) |
| POLYMENT ™ NK-350: | a toluene/2-propanol (70/30) solution of 35 wt % aminoethylated acrylic polymer (produced by Nippon Shokubai Co., Ltd.) |

Production Example of Carboxyl Group-Containing Acrylic Polymer (Table 1)

98 Parts by weight of n-butyl acrylate (BA), 2 parts by weight of acrylic acid (AA), 185.7 parts by weight of ethyl acetate as a solvent, and 0.2 parts by weight of azobis(2,4-dimethylvaleronitrile) (V-65) as a polymerization initiator were reacted at 50° C. for 24 hours in a nitrogen atmosphere to prepare an ethyl acetate solution of acrylic polymer (A-1).

The carboxyl group amount in the polymer was 3.5 mol %, the glass transition temperature (Tg) was −33° C., and the weight average molecular weight was about 580,000.

Ethyl acetate solutions of carboxyl group-containing acrylic polymers (A-2) to (A-10) were obtained in the same manner according to the compositions shown in Table 1. The carboxyl group amount, Tg and weight average molecular weight of each polymer are shown in Table 1.

The carboxyl group amount in the polymer was calculated as a ratio (%) of the molar number of the carboxyl group-containing monomer to the molar number of all monomers.

Production Example of Amino Group-Containing Acrylic Polymer (Table 2)

95 Parts by weight of methyl methacrylate (MMA), 5 parts by weight of dimethylaminoethyl methacrylate (DM), 150 parts by weight of ethyl acetate as a solvent, and 0.6 parts by weight of dimethyl-2,2'-azobis(2-methylpropionate) (V-601) as a polymerization initiator were reacted at 65° C. for 24 hours in a nitrogen atmosphere to prepare an ethyl acetate solution of acrylic polymer (B-1). The amino group amount in the polymer obtained was 3.2 mol %, the glass transition temperature (Tg) was 110° C., and the weight average molecular weight was about 120,000.

Ethyl acetate solutions of amino group-containing acrylic polymers (B-2) to (B-10) were obtained in the same manner according to the compositions shown in Table 2. The amino group amount, Tg and weight average molecular weight of each polymer are shown in Table 2.

The amino group amount in the polymer was calculated as a ratio (%) of the molar number of the amino group-containing monomer to the molar number of all monomers.

Measurement of Tg (glass transition temperature) (less than 30° C.)

The peak temperature of the loss tangent (tan δ) (loss modulus G"/storage modulus G') under the conditions of mode: shear, frequency: 1.0 Hz and temperature: −60 to 30° C. (5.0° C./min) was measured using ARES manufactured by Rheometric Scientific.

Measurement of Tg (glass transition temperature) (30° C. or more)

The peak temperature of the loss tangent (tan δ) (loss modulus E"/storage modulus E') under the conditions of mode: tension, frequency: 10.0 Hz and temperature: 30 to 150° C. (5.0° C./min) was measured using RSA-III manufactured by Rheometric Scientific.

Measurement of Molecular Weight (GPC method-gel permeation chromatography)

The weight average molecular weight (Mw) was measured by the GPC method under the following conditions.

| Apparatus: | HP-1090 Series II (manufactured by Hewlett-Packard) |
|---|---|
| Solvent: | tetrahydrofuran |
| Column: | Plgel MIXED-Bx2 (300 mm × outer diameter: 7.5 mm, inner diameter: 5 mm) |
| Flow rate: | 1.0 mL/min |
| Detection means: | refractive index |
| Sample concentration: | 0.1 wt % |
| Calibration standard: | polystyrene |

Data in the production example of the carboxyl group-containing acrylic polymer and data in the production example of the amino group-containing acrylic polymer are shown in Table 1 and Table 2, respectively.

TABLE 1

Table 1: Production Examples of Carboxyl Group-Containing Acrylic Polymers

| Polymer | Composition (pbw = parts by weight) | Carboxyl Group Amount in Polymer (mol %) | Tg (° C.) | Weight Average Molecular Weight (Mw) |
|---|---|---|---|---|
| A-1 | BA/AA (98:2 pbw) | 3.5 | −33 | 580,000 |
| A-2 | BA/AA (97:3 pbw) | 5.2 | −31 | 580,000 |
| A-3 | BA/AA (96:4 pbw) | 6.9 | −28 | 660,000 |
| A-4 | BA/AA (94:6 pbw) | 10.2 | −21 | 580,000 |
| A-5 | BA/AA (88:12 pbw) | 19.5 | −8 | 230,000 |
| A-6 | BA/AA (85:15 pbw) | 23.9 | 0 | 230,000 |
| A-7 | 2EHA/BA/AA (47:47:6 pbw) | 11.8 | −25 | 630,000 |
| A-8 | 2EHA/AA (92:8 pbw) | 18.2 | −11 | 680,000 |
| A-9 | 10 A/AA (90:10 pbw) | 22.1 | −5 | 680,000 |
| A-10 | iso-BA/AA (90:10 pbw) | 16.5 | 12 | 730,000 |

TABLE 2

Table 2: Production Examples of Amino Group-Containing Acrylic Polymers

| Polymer | Composition (pbw = parts by weight) | Amino Group Amount in Polymer (mol %) | Tg (° C.) | Weight Average Molecular Weight (Mw) |
|---|---|---|---|---|
| B-1 | MMA/DM (95:5 pbw) | 3.2 | 110 | 120,000 |
| B-2 | MMA/DM (94:6 pbw) | 3.9 | 110 | 120,000 |
| B-3 | MMA/BMA/DM (60:34:6 pbw) | 4.4 | 91 | 96,000 |
| B-4 | BMA/DM (94:6 pbw) | 5.5 | 61 | 130,000 |
| B-5 | MMA/BMA/DM (20:74:6 pbw) | 5.0 | 72 | 91,000 |
| B-6 | CHMA/DM (94:6 pbw) | 6.4 | 80 | 120,000 |
| B-7 | MMA/BMA/DM (60:28:12 pbw) | 8.8 | 94 | 89,000 |
| B-8 | MMA/BMA/DM (60:25:15 pbw) | 11.0 | 94 | 87,000 |
| B-9 | MMA/BMA/DMAPAA (59:34:7 pbw) | 5.1 | 98 | 85,000 |
| B-10 | MMA/BMA/Vim (60:34:6 pbw) | 7.1 | 101 | 40,000 |

Preparation of Adhesive Film

Carboxyl group-containing acrylic polymer solutions (A-1) to (A-10) and amino group-containing acrylic polymer solutions (B-1) to (B-10) produced above were mixed at a solid content ratio shown in Tables 3 and 4, and an E-5XM (epoxy-based crosslinking agent, produced by Soken Chemical & Engineering Co., Ltd.) as a crosslinking agent was further added at a solid content ratio of 0.1 wt % to the entire solid content of the polymer. The obtained adhesive was coated on a 38-μm release-treated polyester film (Purex™ A-71, produced by Teijin Ltd.) as a liner to have a dry thickness of 40 μm, dried under heating at 100° C. for 20 minutes, and further dried under heating at 150° C. for 30 minutes. A 80 μm-thick PETG film (DIAFIX™, produced by Mitsubishi Plastics, Inc.) subjected to a corona treatment and coated with, as a primer, POLYMENT™ NK-350 (a toluene/2-propanol solution of 35 wt % aminoethylated acrylic polymer, produced by Nippon Shokubai Co., Ltd.) diluted with ethyl acetate to a solid content of 1.0 wt %, was laminated to the adhesive surface at 70° C. to prepare an adhesive film.

The obtained adhesive film was tested on various adhesive characteristics by the following test methods and evaluation methods. The results are shown in Tables 3 and 4.

Adhesive Force Test

The adhesive film prepared above, from which the liner was removed, was laminated on an adherend (2 mm-thick ABS resin sheet, produced by Coating Tester Kogyo) at 135° C. and cured at 80° C. for 10 minutes and further at 100° C. for 10 minutes. The adhesive film was then cut into a width of 25 mm, and the adhesive force thereof was measured using Tensilon (UCT-100, manufactured by ORIENTEC) at a peel angle of 180° and a peeling rate of 300 mm/min in an atmosphere of 25° C. or 100° C.

In order to obtain the adhesion reliability as a film used for the automobile interior, it is demanded to exert an adhesive force of 10 N/25 mm or more not only at 25° C. but also at 100° C.

Constant-Load Peeling Test

The adhesive film prepared above, from which the liner was removed, was laminated on an adherend (2 mm-thick ABS resin sheet, produced by Coating Tester Kogyo) at 135° C. and cured at 80° C. for 10 minutes and further at 100° C. for 10 minutes. The adhesive film was then cut into a width of 25 mm and a length of 50 mm, a weight of 100 g was hung from an edge part of the adhesive film to apply the load in the 90° direction in an atmosphere of 100° C., and the time until a film length of 50 mm was separated, or the peel length after 24 hours, was measured.

In order to obtain the hot adhering property/hot holding power, it is demanded that the adhesive film can hold for 24 hours or more in a constant-load peeling test at 100° C.

Heat Shaping Test

The adhesive film prepared above, from which the liner was removed, was subjected to 300 area % extension (extension to about 173% in both longitudinal and transverse directions) in an atmosphere of 90° C. by using a film biaxial stretching apparatus (IMC-167D, manufactured by Imoto Seisakusho) and laminated on an adherend (2 mm-thick ABS resin sheet, produced by Coating Tester Kogyo) heated at 90° C. This shaped body was placed in an oven at 110° C. and after 168 hours, the presence or absence of sliding or separation at edges was observed.

In order to obtain the heat resistance reliability as a film used for the automobile interior, sliding and separation at edges should not occur.

Example 1 and Examples 13 to 16

The carboxyl group-containing polymer A-4 (Tg: −21° C., carboxyl group amount: 10.2 mol %) was mixed with each of the amino group-containing polymers B-2, B-7 and B-8, as a result, miscibility was good (the expression "miscibility is good" means that when the film-like adhesive layer after coating and drying the adhesive on a liner was observed with an eye, a state having transparency is provided). A sufficiently high adhesive force was exerted at 25° C. and 100° C., and the hot adhering property/hot holding power was excellent. Therefore, even when the adhesive film was shaped under heating and aged at 110° C. for 168 hours, sliding and separation at edges were not observed.

When the amino group amount was from 3.5 to 11.0 mol %, the miscibility with the carboxyl group-containing polymer was good, and excellent heat resistance and adhering property were exerted.

As for the upper limit of the amino group amount, those having an amino group amount in excess of 15 mol % may be excessively hydrophilic to suffer from poor water resistance.

Examples 2 to 5

The amino group-containing polymer B-3 (Tg: 91° C., amino group amount: 4.4 mol %) was used and mixed with each of the carboxyl group-containing polymers A-2, A-3, A-5 and A-6, as a result, miscibility was good. A sufficiently high adhesive force was exerted at 25° C. and 100° C., and the hot adhering property/hot holding power was excellent. Therefore, even when the adhesive film was shaped under heating and aged at 110° C. for 168 hours, sliding and separation at edges were not observed.

When the carboxyl group amount was from 4.0 to 23.9 mol %, the miscibility with the amino group-containing polymer was good, and excellent heat resistance and adhering property were exerted.

As for the upper limit of the carboxyl group amount, those having a carboxyl group amount in excess of 25 mol % may be excessively hydrophilic to suffer from poor water resistance.

Also, when Tg of the carboxyl group-containing polymer exceeds 25° C., wettability of the adhesive to the adherend may be worsened to decrease the adhering property at ordinary temperature (25° C.).

Examples 6 and 7

A-7 (Tg: −25° C., carboxyl group amount: 11.8 mol %) and A-8 (Tg: −11° C., carboxyl group amount: 18.2 mol %) each using 2-ethylhexyl acrylate (2-EHA) were used as the carboxyl group-containing polymer and each was mixed with the amino group-containing polymer B-3, as a result, miscibility was good. A sufficiently high adhesive force was exerted at 25° C. and 100° C., and the hot adhering property/hot holding power was excellent. Therefore, even when the adhesive film was shaped under heating and aged at 110° C. for 168 hours, sliding and separation at edges were not observed.

Examples 17 and 18

The carboxyl group-containing polymer A-4 and the amino group-containing polymer B-6 using cyclohexyl methacrylate (CHMA) and having Tg of 80° C. were mixed at 65 wt %:35 wt % or 70 wt %:30 wt %, as a result, miscibility was good.

A sufficiently high adhesive force was exerted at 25° C. and 100° C., and the hot adhering property/hot holding power was excellent. Therefore, even when the adhesive film was shaped under heating and aged at 110° C. for 168 hours, sliding and separation at edges were not observed.

Examples 19 and 20

The carboxyl group-containing polymer A-4 (65 wt %) and 35 wt % of each of the amino group-containing polymers B-9 and B-10 using N,N-dimethylaminopropylacrylamide (DMAPAA) and 1-vinylimidazole (Vim), respectively, as the amino group were mixed, as a result, miscibility was good.

A sufficiently high adhesive force was exerted at 25° C. and 100° C., and the hot adhering property/hot holding power was excellent. Therefore, even when the adhesive film was shaped under heating and aged at 110° C. for 168 hours, sliding and separation at edges were not observed.

Example 21

A-10 (Tg: 12° C., carboxyl group amount: 16.5 mol %) using isobutyl acrylate (iso-BA) was used as the carboxyl group-containing polymer and mixed with the amino group-containing polymer B-3, as a result, miscibility was good. A sufficiently high adhesive force was exerted at 25° C. and 100° C., and the hot adhering property/hot holding power was excellent. Therefore, even when the adhesive film was shaped under heating and aged at 110° C. for 168 hours, sliding and separation at edges were not observed.

Also, when the Tg of the carboxyl group-containing polymer exceeds 25° C., wettability of the adhesive to the adherend may be worsened to decrease the adhering property at ordinary temperature (25° C.).

In various compositions, the acrylic polymer containing 4.0 mol % or more of carboxy group and having Tg of 25° C. or less has good miscibility with the acrylic polymer containing 3.5 mol % or more of amino group and having Tg of 75° C. or more, and the adhesive composition where these polymers are blended at from 75 wt %:25 wt % to 62 wt %:38 wt % exerts a sufficiently high adhesive force at 25° C. and 100° C. and is excellent in the hot adhering property/hot holding power.

Comparative Example 1

A normal pressure-sensitive adhesive A-9 not containing an amino group-containing polymer was used, as a result, the hot adhesive force was low and the hot adhering property/hot holding power was poor. Therefore, separation occurred from edges during aging at 110° C. after shaping under heating.

Comparative Example 2

The polymer B-1 (Tg: 110° C., amino group amount: 3.2 mol %) where the amino group amount is less than 3.5 mol % was used, as a result, miscibility with the carboxyl group-containing polymer A-4 was bad. Therefore, the adhering property was significantly deteriorated and the hot adhering property/hot holding power was poor. Also, separation occurred from edges during aging at 110° C. after shaping under heating.

Comparative Example 3

The polymer A-1 (Tg: −33° C., carboxyl group amount: 3.5 mol %) where the carboxyl group amount is less than 4.0 mol % was used, as a result, miscibility with the amino group-containing polymer B-3 was bad. Satisfactory adhering property was exerted at 25° C. and 100° C., but the hot adhering property/hot holding power was poor and separation occurred from edges during aging at 110° C. after shaping under heating.

Comparative Examples 4, 5, 13 and 14

The carboxyl group-containing polymer A-4 was mixed with the amino group-containing polymer B-4 (Tg: 61° C.) or B-5 (Tg: 72° C.) where the Tg is less than 75° C., as a result, miscibility was good.

Satisfactory adhering property was exerted at 25° C. and 100° C. but due to low Tg of the amino group-containing polymer, the hot adhering property/hot holding power was poor and separation occurred from edges during aging at 110° C. after shaping under heating.

Comparative Examples 6 and 7

The carboxyl group-containing polymer A-4 (60 wt %) was mixed with 40 wt % of the amino group-containing polymer B-2 (Tg: 110° C.) or B-6 (Tg: 80° C.) where the Tg exceeds 75° C., as a result, miscibility was good.

Satisfactory adhering property was exerted at 100° C. and sliding and separation were not observed in aging at 110° C. for 168 hours after shaping under heating, but due to the large blending amount of 40 wt % of the amino group-containing polymer, the adhesive force at ordinary temperature (25° C.) was extremely decreased.

The results as to the adhesive characteristics in Examples 1 to 7 and 13 to 21 and Comparative Examples 1 to 7, 13 and 14 are shown in Table 3.

TABLE 3

Table 3: Adhesive Characteristics

| | Carboxyl Group-Containing Polymer | | Amino Group-Containing Polymer | | Mixing Ratio | Adhesive Force (N/25 mm) | | Constant-Load Peeling | Heat Shaping Test |
|---|---|---|---|---|---|---|---|---|---|
| | Carboxyl Group (mol %) | Tg (° C.) | | Amino Group (mol %) | Tg (° C.) | (wt %) (solid content ratio) | 25° C. | 100° C. | (hours or mm) | |
| Comparative Example 1 | A-11 | 22.1 | −5 | — | — | — | 100:0 | 34.4 | 5.8 | <1 H | separated |
| Comparative Example 2 | A-4 | 10.2 | −21 | B-1 | 3.2 | 110 | 70:30 | 0.3 | 1.2 | <1 H | separated |
| Comparative Example 3 | A-1 | 3.5 | −33 | B-3 | 4.4 | 91 | 70:30 | 41.6 | 10.4 | <1 H | separated |
| Comparative Example 4 | A-4 | 10.2 | −21 | B-4 | 5.5 | 61 | 60:40 | 41.9 | 9.7 | 4 H | separated |
| Comparative Example 5 | A-4 | 10.2 | −21 | B-5 | 5.0 | 72 | 60:40 | 54.8 | 15.6 | 6 H | separated |
| Comparative Example 6 | A-4 | 10.2 | −21 | B-2 | 3.9 | 110 | 60:40 | 1.9 | 14.6 | 8.0 mm | no change |
| Comparative Example 7 | A-4 | 10.2 | −21 | B-6 | 6.4 | 80 | 60:40 | 6.2 | 22.3 | 2.5 mm | no change |
| Comparative Example 13 | A-4 | 10.2 | −21 | B-4 | 5.5 | 61 | 65:35 | 50.3 | 9.9 | 2 H | separated |
| Comparative Example 14 | A-4 | 10.2 | −21 | B-5 | 5.0 | 72 | 65:35 | 59.8 | 11.9 | 5 H | separated |
| Example 1 | A-4 | 10.2 | −21 | B-2 | 3.9 | 110 | 70:30 | 16.2 | 15.3 | 4.2 mm | no change |
| Example 2 | A-2 | 5.2 | −31 | B-3 | 4.4 | 91 | 70:30 | 55.3 | 20.9 | 10.0 mm | no change |
| Example 3 | A-3 | 6.9 | −28 | B-3 | 4.4 | 91 | 70:30 | 65.2 | 12.1 | 41.5 mm | no change |
| Example 4 | A-5 | 19.5 | −8 | B-3 | 4.4 | 91 | 70:30 | 33.6 | 21.1 | 17.0 mm | no change |
| Example 5 | A-6 | 23.9 | 0 | B-3 | 4.4 | 91 | 70:30 | 16.7 | 20.4 | 16.0 mm | no change |
| Example 6 | A-7 | 11.8 | −25 | B-3 | 4.4 | 91 | 70:30 | 57.4 | 10.2 | 32.8 mm | no change |
| Example 7 | A-8 | 18.2 | −11 | B-3 | 4.4 | 91 | 70:30 | 31.3 | 11.6 | 13.0 mm | no change |

TABLE 3-continued

Table 3: Adhesive Characteristics

| | Carboxyl Group-Containing Polymer | | Amino Group-Containing Polymer | | Mixing Ratio | Adhesive Force (N/25 mm) | | Constant-Load Peeling | Heat Shaping Test |
|---|---|---|---|---|---|---|---|---|---|
| | Carboxyl Group (mol %) | Tg (° C.) | Amino Group (mol %) | Tg (° C.) | (wt %) (solid content ratio) | 25° C. | 100° C. | (hours or mm) | |
| Example 13 | A-4  10.2 | −21 | B-7  8.8 | 94 | 65:35 | 60.4 | 17.0 | 19.5 mm | no change |
| Example 14 | A-4  10.2 | −21 | B-7  8.8 | 94 | 70:30 | 65.6 | 15.8 | 33.0 mm | no change |
| Example 15 | A-4  10.2 | −21 | B-8  11.0 | 94 | 65:35 | 66.5 | 18.0 | 13.5 mm | no change |
| Example 16 | A-4  10.2 | −21 | B-8  11.0 | 94 | 70:30 | 64.9 | 14.1 | 30.0 mm | no change |
| Example 17 | A-4  10.2 | −21 | B-6  6.4 | 80 | 65:35 | 11.0 | 20.2 | 6.0 mm | no change |
| Example 18 | A-4  10.2 | −21 | B-6  6.4 | 80 | 70:30 | 39.5 | 18.1 | 6.6 mm | no change |
| Example 19 | A-4  10.2 | −21 | B-9  5.1 | 98 | 65:35 | 54.0 | 17.7 | 9.9 mm | no change |
| Example 20 | A-4  10.2 | −21 | B-10  7.1 | 101 | 65:35 | 52.9 | 15.0 | 13.5 mm | no change |
| Example 21 | A-10  16.5 | 12 | B-3  4.4 | 91 | 70:30 | 10.9 | 22.7 | 6.0 mm | no change |

Examples 8 to 12 and Comparative Examples 8 to 12

The carboxyl group-containing polymer A-4 (Tg: −21° C., carboxyl group amount: 10.2 mol %) and the amino group-containing polymer B-3 (Tg: 91° C., amino group amount: 4.4 mol %) were mixed at various mixing ratios, and the adhering property was evaluated. In any blending, miscibility was good.

As the blending amount of the amino group-containing polymer is increased, the hot adhesive force was elevated and the hot adhering property/hot holding power was enhanced, but the adhering property at a room temperature (25° C.) was decreased.

When the amino group-containing polymer content was less than 25 wt %, satisfactory adhering property was exerted at 25° C. and 100° C., but the hot adhering property/hot holding power was poor. Therefore, separation a room from edges in aging at 110° C. after shaping under heating.

When the amino group-containing polymer content was from 25 to 38 wt %, satisfactory adhering property was exhibited not only at 25° C. but also 100° C., the hot adhering property/hot holding power was good, and sliding and separation at edges were not observed at all even in aging at 110° C. for 168 hours after shaping under heating.

When the amino group-containing polymer content was 40 wt % or more, adhering property at 100° C. was satisfactorily exerted, and sliding and separation were not observed even in aging at 110° C. for 168 hours after shaping under heating, but the adhesive force at a room temperature (25° C.) was extremely decreased.

The results as to adhesive characteristics (mixing ratio) in Examples 8 to 12 and Comparative Examples 8 to 12 are shown in Table 4.

TABLE 4

Table 4: Adhesive Characteristics (mixing ratio)

| | Carboxyl Group-Containing Polymer | Amino Group-Containing Polymer | Mixing Ratio (wt %) | Adhesive Force (N/25 mm) | | Constant-Load Peeling (hours or mm) | Heat Shaping Test |
|---|---|---|---|---|---|---|---|
| | | | | 25° C. | 100° C. | | |
| Comparative Example 8 | A-4 | B-3 | 85:15 | 54.7 | 12.4 | 8 H | separated |
| Comparative Example 9 | A-4 | B-3 | 80:20 | 38.3 | 9.2 | 18 H | separated |
| Example 8 | A-4 | B-3 | 75:25 | 50.7 | 11.2 | 30.1 mm | no change |
| Example 9 | A-4 | B-3 | 70:30 | 20.6 | 12.0 | 17.5 mm | no change |
| Example 10 | A-4 | B-3 | 65:35 | 12.1 | 12.2 | 12.1 mm | no change |
| Example 11 | A-4 | B-3 | 63.5:36.5 | 65.1 | 17.7 | 12.9 mm | no change |
| Example 12 | A-4 | B-3 | 62:38 | 65.0 | 17.3 | 12.0 mm | no change |
| Comparative Example 10 | A-4 | B-3 | 60:40 | 3.1 | 12.4 | 6.6 mm | no change |
| Comparative Example 11 | A-4 | B-3 | 55:45 | 0.2 | 12.4 | 10.3 mm | no change |
| Comparative Example 12 | A-4 | B-3 | 50:50 | 0.5 | 7.0 | 4.8 mm | no change |

The adhesive film of the present invention can be advantageously used for adhering a decoration film, a protective film or the like onto a three-dimensional product particularly by using a vacuum heat and pressure applicator and is suitable not only for an automobile interior product requiring high-temperature durability, for example, up to 100° C. but also for the decoration, protection or the like of a three-dimensional product such as building material, decorative laminate and washstand.

What is claimed is:

1. An adhesive film comprising a substrate and an adhesive layer on said substrate, said adhesive layer comprising the following components (A) and (B):

(A) a carboxyl group-containing (meth)acrylate polymer having a glass transition temperature (Tg) of 25° C. or lower, said carboxyl group-containing (meth)acrylate polymer having a percent number of repeating units of 4.0 to 25% based on the total number of repeating units of the (meth)acrylate polymer; and (B) an amino group-containing (meth)acrylate polymer having a glass transition temperature (Tg) of 75° C. or higher, said amino group-containing (meth)acrylate polymer having a percent number of repeating units of 3.5 to 15% based on the total number of repeating units of the (meth)acrylate polymer, wherein the ratio by weight of said component (A) to said component (B) is from 62:38 to 75:25.

2. The adhesive film according to claim 1, wherein said component (A) is a copolymer from a mono-ethylenically-unsaturated monomer and a unsaturated monomer containing a carboxyl group, and said component (B) is a copolymer form a mono-ethylenically-unsaturated monomer and a unsaturated monomer containing an amino group.

3. The adhesive film according to claim 2, wherein said mono-ethylenically-unsaturated monomer is alkyl (meth) acrylate having 1 to 12 carbon atoms.

4. The adhesive film according to claim 2, wherein said unsaturated monomer containing an amino group is selected from the group consisting of dialkylaminoalkyl (meth)acrylate, dialkylaminoalkyl (meth)acrylamide and an unsaturated monomer having a nitrogen-containing heterocyclic ring.

5. The adhesive film according to claim 1, which is a decoration film.

6. The adhesive film according to claim 1, wherein said substrate is a resin film.

7. The adhesive film according to claim 1, wherein said adhesive film can hold for 24 hours or more in a constant-load peeling test.

8. A method for forming a shaped body comprising:
providing an adhesive film comprising a substrate and an adhesive layer on said substrate, said adhesive layer comprising the following components (A) and (B):
(A) a carboxyl group-containing (meth)acrylate polymer having a glass transition temperature (Tg) of 25° C. or lower, said carboxyl group-containing (meth) acrylate polymer having a percent number of repeating units of 4.0 to 25% based on the total number of repeating units of the (meth)acrylate polymer; and
(B) an amino group-containing (meth)acrylate polymer having a glass transition temperature (Tg) of 75° C. or higher, said amino group-containing (meth)acrylate polymer having a percent number of repeating units of 3.5 to 15% based on the total number of repeating units of the (meth)acrylate polymer,
wherein the ratio by weight of said component (A) to said component (B) is from 62:38 to 75:25;
adhering the adhesive film to a surface of a shaped body under heat and pressure.

9. The method according to claim 8, wherein the shaped article has a three dimensional surface and said adhering of the adhesive film is carried out by using vacuum heat and the application of pressure.

10. The method according to claim 8, wherein the adhesive film is adhered under pressure at an elevated temperature of 100° C.

11. A shaped article comprising a surface and an adhesive film, wherein said adhesive film is adhered onto said surface, and said film comprises a substrate and an adhesive layer on said substrate, said adhesive layer comprising the following components (A) and (B):
(A) a carboxyl group-containing (meth)acrylate polymer having a glass transition temperature (Tg) of 25° C. or lower, said carboxyl group-containing (meth)acrylate polymer having a percent number of repeating units of 4.0 to 25% based on the total number of repeating units of the (meth)acrylate polymer; and
(B) an amino group-containing (meth)acrylate polymer having a glass transition temperature (Tg) of 75° C. or higher, said amino group-containing (meth)acrylate polymer having a percent number of repeating units of 3.5 to 15% based on the total number of repeating units of the (meth)acrylate polymer,
wherein the ratio by weight of said component (A) to said component (B) is from 62:38 to 75:25.

12. The shaped article according to claim 11 forming at least an interior part of a vehicle.

13. The shaped article according to claim 11, wherein said component (A) is a copolymer from a mono-ethylenically-unsaturated monomer and a unsaturated monomer containing a carboxyl group, and said component (B) is a copolymer form a mono-ethylenically-unsaturated monomer and a unsaturated monomer containing an amino group.

14. The shaped article according to claim 13, wherein said mono-ethylenically-unsaturated monomer is alkyl (meth) acrylate having 1 to 12 carbon atoms.

15. The shaped article according to claim 13, wherein said unsaturated monomer containing an amino group is selected from the group consisting of dialkylaminoalkyl (meth)acrylate, dialkylaminoalkyl (meth)acrylamide and an unsaturated monomer having a nitrogen-containing heterocyclic ring.

16. The shaped article according to claim 11, which is a decoration film.

17. The shaped article according to claim 11, wherein said substrate is a resin film.

18. The shaped article according to claim 11, wherein said adhesive film can hold for 24 hours or more in a constant-load peeling test.

* * * * *

UNITED STATES PATENT AND TRADEMARK OFFICE
CERTIFICATE OF CORRECTION

PATENT NO. : 8,470,931 B2
APPLICATION NO. : 12/669935
DATED : June 25, 2013
INVENTOR(S) : Yorinobu Takamatsu et al.

It is certified that error appears in the above-identified patent and that said Letters Patent is hereby corrected as shown below:

Title Page
Column 1, line 1, Delete "Innovation" and insert -- Innovative --, therefor.
Column 2 (abstract), Line 4, Delete "25 C" and insert -- 25° C --, therefor.
Column 2 (abstract), Line 9, Delete "75 C" and insert -- 75° C --, therefor.

In the Specification
Column 8
Line 14, Delete "peroxidicarbonate," and insert -- peroxydicarbonate, --, therefor.

In the Claims
Column 19
Line 18, In Claim 2, delete "form" and insert -- from --, therefor.

Column 20
Line 35, In Claim 13, delete "form" and insert -- from --, therefor.

Signed and Sealed this
Twelfth Day of November, 2013

Teresa Stanek Rea
*Deputy Director of the United States Patent and Trademark Office*